(12) United States Patent
Hahn et al.

(10) Patent No.: US 11,752,757 B2
(45) Date of Patent: Sep. 12, 2023

(54) TRANSPORT CYLINDER, DRYING UNIT COMPRISING THIS TRANSPORT CYLINDER, AND SHEET-FED PRINTING PRESS COMPRISING THIS DRYING UNIT

(71) Applicant: KOENIG & BAUER AG, Würzburg (DE)

(72) Inventors: Thilo Hahn, Dettelbach (DE); Patrick Kress, Bad Mergentheim-Edelfingen (DE); Volker Scharkus, Veitshöchheim (DE); Robert Stierman, Alphen aan den Rijn (NL)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 18/015,754

(22) PCT Filed: Jan. 19, 2022

(86) PCT No.: PCT/EP2022/051065
§ 371 (c)(1),
(2) Date: Jan. 12, 2023

(87) PCT Pub. No.: WO2022/189048
PCT Pub. Date: Sep. 15, 2022

(65) Prior Publication Data
US 2023/0211600 A1    Jul. 6, 2023

(30) Foreign Application Priority Data
Mar. 11, 2021  (DE) .................... 10 2021 105 926.7

(51) Int. Cl.
*B41F 21/10* (2006.01)
*B41F 21/05* (2006.01)
(Continued)

(52) U.S. Cl.
CPC .............. *B41F 21/05* (2013.01); *B41F 21/12* (2013.01); *B41F 23/045* (2013.01)

(58) Field of Classification Search
None
See application file for complete search history.

(56) References Cited

U.S. PATENT DOCUMENTS

2015/0246525 A1    9/2015  Maul et al.

FOREIGN PATENT DOCUMENTS

DE          2855605 C2     1/1985
DE     102015013068 A1     3/2017
(Continued)

OTHER PUBLICATIONS

International Search Report of PCT/EP2022/051065 dated May 6, 2022.

*Primary Examiner* — Leslie J Evanisko
(74) *Attorney, Agent, or Firm* — MATTINGLY & MALUR, PC

(57) ABSTRACT

In some examples, a transport cylinder for transporting a sheet-format substrate includes at least one channel extending on an outer surface of the transport cylinder in an axial direction. Each channel includes at least one gripper, which is supported on a shaft, for holding a substrate on the outer surface of the transport cylinder. Each channel is covered by a respective cover at the outer surface of the transport cylinder. The cover and/or a shaft supporting the at least one gripper may include a cooling unit. In some examples, a drying unit that includes the transport cylinder may further include an electron beam for curing a printing fluid on a substrate on the transport cylinder. In some examples, a printing press may include the drying unit including the transport cylinder.

15 Claims, 2 Drawing Sheets

(51) Int. Cl.
*B41F 21/12* (2006.01)
*B41F 23/04* (2006.01)

(56) References Cited

FOREIGN PATENT DOCUMENTS

| | | | |
|---|---|---|---|
| DE | 112012006348 B4 | 9/2018 | |
| DE | 202021001239 U1 | 4/2021 | |
| EP | 2156951 A2 * | 2/2010 | ............. B41F 13/22 |
| JP | 08-39778 A | 2/1996 | |
| WO | 2020108864 A1 | 6/2020 | |
| WO | 2020200703 A1 | 10/2020 | |

* cited by examiner

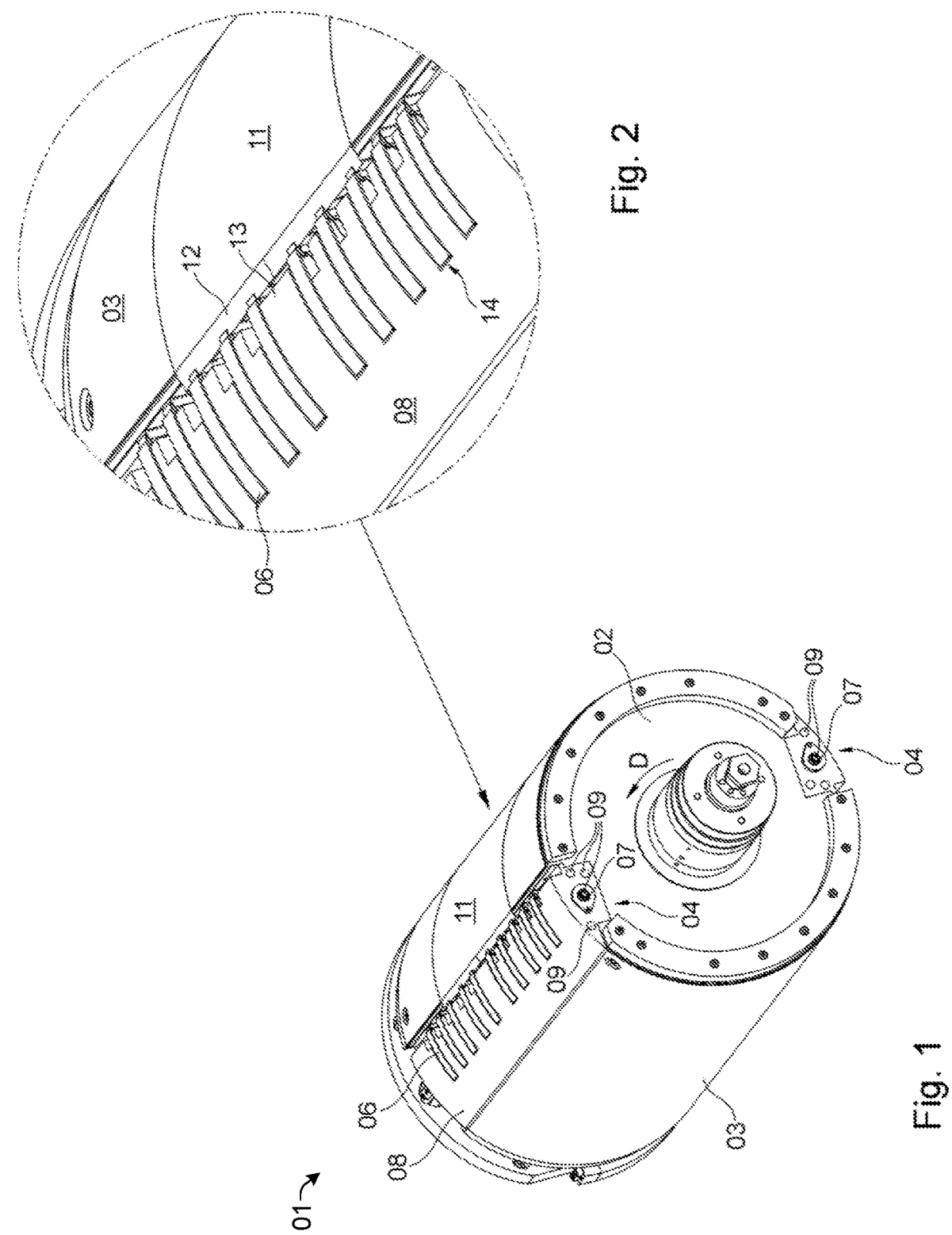

TRANSPORT CYLINDER, DRYING UNIT COMPRISING THIS TRANSPORT CYLINDER, AND SHEET-FED PRINTING PRESS COMPRISING THIS DRYING UNIT

CROSS-REFERENCES TO RELATED APPLICATIONS

This application is the US national phase, under 35 USC § 371, of PCT/EP2022/051065, filed on Jan. 19, 2022, published as WO 2022/189048 A1 on Sep. 15, 2022, and claiming priority to DE 10 2021 105 926.7, filed Mar. 11, 2021, the disclosures of which are expressly incorporated by reference herein in their entireties.

TECHNICAL FIELD

Examples herein relate to a transport cylinder, a drying unit, and a sheet-fed printing press comprising the drying unit. For instance, a transport cylinder for transporting a sheet-format substrate may include at least one channel extending on an outer surface of the transport cylinder in an axial direction. Each channel includes at least one gripper, which is supported on a shaft, for holding a substrate on the outer surface of the transport cylinder.

Additionally, in some examples, a drying unit for drying a radiation-curing printing fluid on a sheet-format substrate includes a chamber including a gaseous medium that is oxygen-reduced by an inert gas. For example, the oxygen-reduced gaseous medium in the chamber may have an oxygen content of no more than one percent. An electron beam generator provides an electron beam that is directed at the substrate in the chamber for drying the radiation-curing printing fluid. The substrate may be guided, or at least guidable, through the chamber while being held at the outer surface of the transport cylinder herein.

Furthermore, in some examples, a printing press includes at least one printing unit for printing sheet-format substrates with a radiation-curing printing fluid, and a drying unit that is arranged downstream from the printing unit in a transport direction of the substrates. The drying unit dries the radiation-curing printing fluid on the substrates, and includes a chamber including a gaseous medium that is oxygen-reduced by an inert gas. The oxygen-reduced gaseous medium in the chamber has an oxygen content of no more than one percent. An electron beam generator provides an electron beam that is directed at the respective substrate in the chamber for drying the radiation-curing printing fluid. The substrate is guided, or at least is guidable, through the chamber while being held at the outer surface of the transport cylinder, which is arranged in a stationary manner in a frame of the printing press.

BACKGROUND

A device for inertizing and shielding coated flexible bands passing through an inertization chamber, such as films, is known from DE 28 55 605 C2, wherein the bands are exposed to ionizing radiation, and the bands are guided on the cooled outer surface of a rotatably mounted roller along a curved path through the inertization chamber containing nitrogen, for example, as the inert gas.

A drying device comprising a cylinder for transporting a printed sheet through a drying device is known from DE 10 2015 013 068 A1, comprising at least one gripper bar for fixing a leading edge of the sheet to an outer surface of the cylinder and means for generating a vacuum pressure at the outer surface, which presses the sheet in a planar manner against the outer surface, wherein an irradiation module, in particular a UV irradiation module, faces the cylinder, and the means include multiple vacuum chambers, which are distributed in the cylinder in the circumferential direction, and open into the bore holes of the outer surface.

A combination printing press, which comprises at least one unit for light-curing printing inks, is known from DE 11 2012 006 348 B4, wherein the unit for light-curing printing inks comprises a UV and/or an infrared drying device, and a paper transport and drying cylinder for cooling and holding, and the wall of this cylinder is provided with a cooling channel that is connected to a cooling water line and with intake air openings that are connected to an air chamber.

A transport cylinder in a finish coating mechanism is known from JP H08-39 778 A, wherein this cylinder comprises a cooling unit in its wall.

A device for cooling a gripper bar at a sheet transport device in a printing press is known from the post-published DE 20 2021 001 239 U1, wherein the sheet transport device is configured as a cylinder including at least one line for cooling fluid, and the gripper bar and a wall of the line are in contact with one another.

A drying unit for drying printed substrates is known from WO 2020/108864 A1, comprising a chamber containing a gaseous medium that is oxygen-reduced by an inert gas; the substrates being guided, or at least being guidable, through this chamber; the chamber, in the transport direction of the substrates, including an entrance for the substrates to be guided into this chamber; the entrance for substrates to be guided into the chamber being formed by two cylinders that are each longitudinally positioned against one another; the two cylinders that are positioned against one another at the entrance of the chamber forming a printing unit; one of the cylinders being configured as a printing cylinder, and the other cylinder being configured as a cylinder that cooperates with the printing cylinder and applies a printed image to the relevant substrates; the two cylinders that are positioned against one another with pressure, at the entrance of the chamber, forming a seal, which extends axially with respect to these cylinders, to prevent the oxygen-reduced gaseous medium from escaping from this chamber and/or to prevent oxygen from the ambient air from entering this chamber; and the printing unit arranged at the entrance of the chamber being configured as a printing unit printing in a gravure printing process.

When, in an industrial mass production operation of printed matter, a drying of fluids applied to a substrate is to be accelerated and drying sections are to be shortened, it is possible to use dryers, which subject the fluid to be dried to a considerably higher energy density in a very short time compared to conventional dryers, which provide drying, for example, by way of hot air and/or by infrared radiation. If in addition, instead of a water-based printing fluid, for example, a radiation-curing printing fluid in the form of, for example, a radiation-curing printing color, ink or a corresponding coating material is applied onto the particular substrate, this printing fluid is not dried by evaporation or penetration of its solvent, but by curing of its at least one polymer present in this printing fluid, for example an acrylate oligomer and monomer, whereby this at least one polymer, during its radiation-induced polymerization, is incorporated into the film that results from this printing fluid on the surface of the relevant substrate. The curing process of a radiation-curing printing fluid can be carried out in a production process at a production speed that is not excessively high, for example using a UV radiation source.

Compared to the duration for which the printing fluid to be dried, that is, in this case to be cured, usually has to be exposed to UV radiation sources, however, the drying time is shortened considerably to the range of only a few milliseconds when a high-energy radiation source, such as an electron beam source, is used, so that the curing of a radiation-curing printing fluid is also made possible in production processes having a very high production speed. Here, for example when printing sheets, a high production speed shall be considered to cover production processes having a throughput of considerably more than 10,000 sheets per hour.

However, when using an electron beam source, it must be noted that an impingement of electron beams on a substrate and a penetration of these beams into a printing fluid are generally accompanied by a generation of X-rays reflected on all sides and by a partial conversion into thermal radiation so that, in contrast to the use of a UV radiation source, at least suitable radiation protection measures are required in the case of an electron beam source. The thermal radiation, especially when industrially mass-producing substrates dried in this way, also results in considerable heating of the transport device transporting the particular substrate through the drying chamber of the relevant drying unit. Moreover, the curing initiated by an electron beam source, that is, the setting reaction of the printing fluid carried out as a result of the polymerization, must take place in an oxygen-reduced, inert atmosphere, in which the oxygen content must not exceed 1% to achieve a high production quality, preferably be in a range between 300 ppm and 500 ppm, in particular in the range between 150 ppm and 250 ppm, if necessary even lower down into the range of less than 50 ppm, so that considerable measures for sealing the drying chamber are required. Due to the high requirements with regard to the sealing of the drying chamber, it is also disadvantageous to configure the transport device, which is, for example, configured as a transport cylinder, transporting the substrates through the drying chamber, as a suction cylinder since the suction air openings, formed at the outer surface of the suction cylinder, at least make it considerably more difficult, if not practically impossible, to maintain the oxygen-reduced, inert atmosphere in the drying chamber. A dryer comprising an electron beam source thus generally necessitates a greater design complexity at its place of use than the use of a conventional dryer or a UV radiation source.

Particularly in light of the sealing problem, DE 28 55 605 C2 refrained from guiding sheet-format substrates through the drying chamber of a dryer using an electron beam source since sheet-format substrates, in contrast to a material web, must be held at their respective transport device, which is configured, for example, as a cylinder, in order to be transported in a manner that is safe for operation. During the accelerated drying of sheet-format substrates that are transported by a transport cylinder through an irradiation module and printed with a radiation-curing printing fluid, according to DE 10 2015 013 068 A1 a UV radiation source was used thus far to avoid necessary radiation protection measures and due to the sealing problem. And those seeking to use an electron beam source, despite the required radiation protection measures and the sealing problem, for drying sheet-format substrates that are printed with a radiation-curing printing fluid, WO 2020/108864 A1 recommends using a gripperless transport cylinder or a conveyor belt for transporting these substrates through the drying chamber.

SUMMARY

An object herein is to devise a transport cylinder for transporting a sheet-format substrate, a drying unit for drying a radiation-curing printing fluid on a sheet-format substrate, and a sheet-fed printing press comprising this drying unit.

This object is achieved in some examples by a transport cylinder that includes a channel that is covered by a respective cover at the outer surface of the transport cylinder, and in which the cover and/or a shaft supporting at least one gripper includes a cooling unit. Additionally, in some examples, a drying unit that includes an electron beam for curing a printing fluid on a substrate includes the transport cylinder having the cooling unit included with at least one of the cover or a shaft supporting at least one gripper. Furthermore, in some examples, a printing press may include the drying unit including the transport cylinder having the cooling unit included with at least one of the cover or the shaft supporting at least one gripper. The respective dependent claims in each case relate to advantageous embodiments and/or refinements of the identified solution.

The advantages achieved with the invention are, in particular, that the proposed transport cylinder is used to hold sheet-format substrates, in particular while being transported through a drying chamber of a drying unit drying by means of an electron beam, at the outer surface of the relevant transport cylinder in a manner that is safe for operation, wherein the cover of the relevant channel and the configuration of the particular gripper as an underfloor gripper yield good sealing of this transport cylinder with respect to the drying chamber of the drying unit having an oxygen-reduced inert atmosphere, and additionally heat generated by the electron beam is reliably dissipated at least by the holding means of this transport cylinder, which are configured in each case as grippers.

BRIEF DESCRIPTION OF THE DRAWINGS

An exemplary embodiment of the invention is illustrated in the drawings and will be described in greater detail below. The drawings show:

FIG. 1 a transport cylinder for transporting a sheet-format substrate;

FIG. 2 a detail of FIG. 1; and

DETAILED DESCRIPTION

Figure 3:
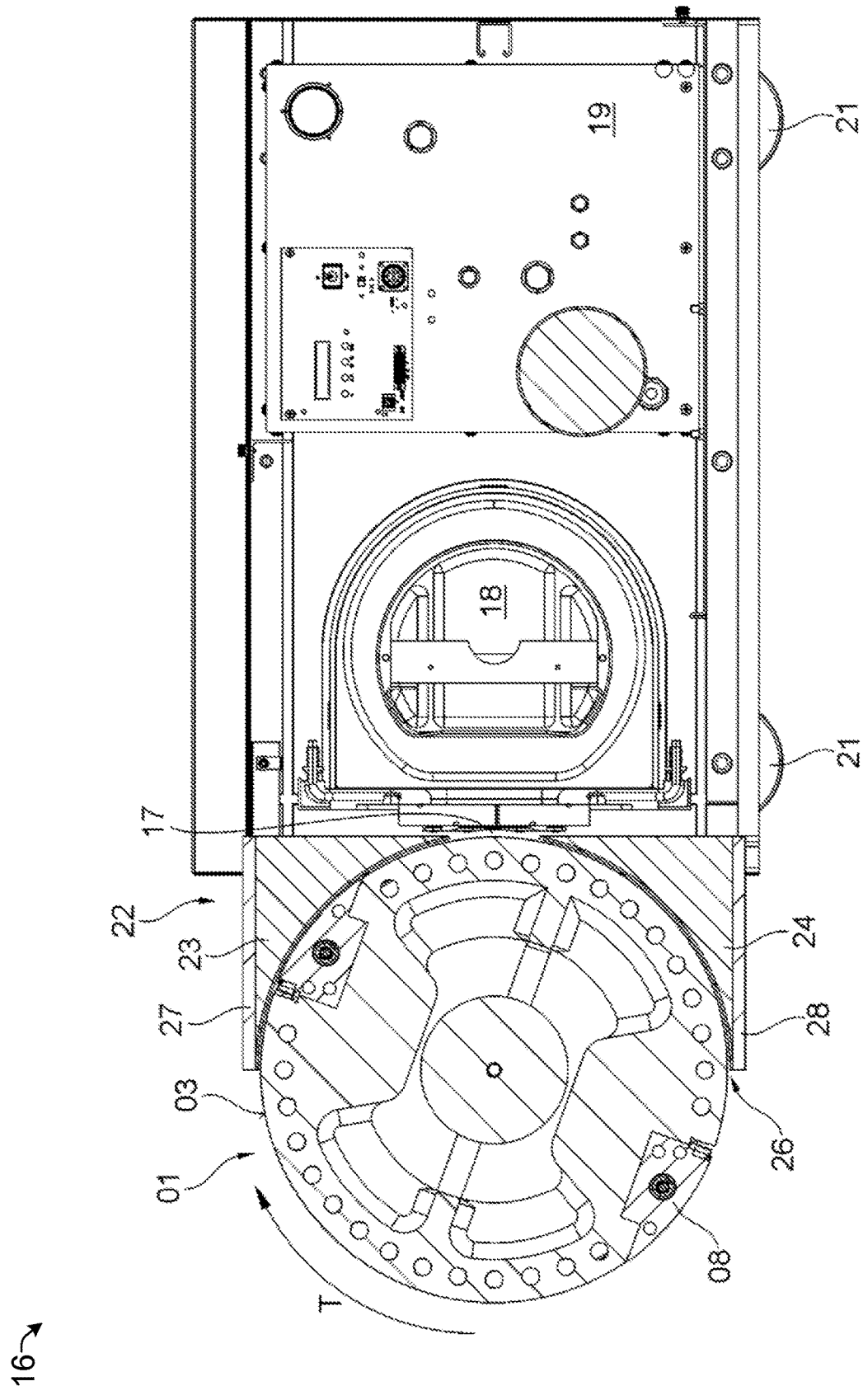
FIG. 3 a drying unit comprising a transport cylinder according to FIGS. 1 and 2.

FIG. 1, by way of example, shows a transport cylinder 01 for transporting a sheet-format substrate 11 that is printed, for example, with a printing fluid in a perspective illustration. FIG. 2 shows an enlargement of a detail of the transport cylinder 01 shown in FIG. 1. In its main body 02, which is preferably made of a casting material, for example made of cast iron, this transport cylinder 01 at its outer surface 03, which is preferably at least over 90% closed, includes at least one channel 04, which extends in the axial direction, that is, transversely to the transport direction T of the relevant substrate 11, wherein such a channel 04 is also referred to as a cylinder pit. The transport cylinder 01 is preferably configured to be double-sized so that, at its circumference, two channels 04, which extend at the outer surface 03, in each case in its axial direction, are formed in a diametrically opposing manner and two sheet-format substrates 11, for example, can be held at its outer surface 03 one behind the other. Serving as a transport cylinder 01 that is configured to be double-sized, the cylinder has a diameter in the range of, for example, 500 mm to 700 mm, and preferably of, for example, 550 mm to 600 mm. The outer surface 03 of this transport cylinder 01 is in particular closed insofar as no flow channels, for example for guiding suction air, which extend radially into its interior, join at its outer surface 03. In cooperation with the particular channel 04, the outer surface 03 of this transport cylinder 01 only has a slot-shaped opening, which extends in each case in its axial direction, where one end of the sheet-format substrate 11 to be transported is to be held at this outer surface 03.

At least one gripper 06 for holding the relevant substrate 11 on the outer surface 03 of this transport cylinder 01 is arranged in each case in the relevant channel 04. In a particularly preferred embodiment, a gripper bar including multiple, for example ten or more, grippers 06, arranged next to one another in the axial direction of this transport cylinder 01, is provided in each case in the relevant channel 04. The at least one gripper 06 is pivotably mounted on a shaft 07 extending in the axial direction of this transport cylinder 01, wherein this shaft 07 is arranged in the relevant channel 04 so as to cooperate, for example, with a spring, and in particular with a torsion spring. In a first operating state, the at least one gripper 06 is pivoted by a pivoting movement, brought about by a servo mechanism, in particular against the force of the relevant spring into a first position, in which a forward end 12 of a sheet-format substrate 11 to be held on the outer surface 03 of this transport cylinder 01 can be inserted through a slot-shaped opening, which is released by the relevant gripper 06, into the relevant channel 04. In a second operating state shown in each case in FIGS. 1 and 2, the at least one gripper 06 is pivoted by a pivoting movement, brought about by the servo mechanism and/or by the relevant spring, into a second position, in which the forward end 12, in the direction of rotation D of the transport cylinder 01, of the sheet-format substrate 11 to be held on the outer surface 03 of this transport cylinder 01 is held in the relevant channel 04, in particular by way of clamping. The direction of rotation D of the transport cylinder 01 is indicated by a rotational direction arrow in FIG. 1. In this second position, the at least one gripper 06 is arranged completely beneath a plane formed by the outer surface 03 of this transport cylinder 01, which is why a gripper 06 arranged in this way is also referred to as an underfloor gripper.

The relevant channel 04 is covered by a cover 08 at the outer surface 03 of this transport cylinder 01, wherein the cover 08 preferably covers the relevant channel 04 in the plane formed by the outer surface 03 of this transport cylinder 01 and, at the location of the relevant gripper 06, includes a recess 14 that is adapted to the contour of the relevant gripper 06 which is formed at the outer surface 03 of this transport cylinder 01, wherein the cover 08, in the case of multiple grippers 06 that are arranged next to one another in the axial direction, in each case forms tongue-shaped regions 13, for example, at the outer surface 03 of this transport cylinder 01 between adjacent grippers 06 (FIG. 2). The relevant cover 08 is preferably configured in one piece, for example by a solid steel sheet or by a solid, preferably metallic, molded part. Moreover, the relevant cover 08 and/or the shaft 07 supporting the at least one gripper 06 each comprise a cooling unit. The relevant cooling unit comprises, for example, at least one pipe 09 extending in the axial direction of this transport cylinder 01 and/or at least one continuous bore hole 09, which is configured in the relevant cover 08 and/or in the relevant shaft 07 and extends in the axial direction of this transport cylinder 01, wherein in each case a liquid or gaseous cooling medium flows, or at least can flow, through the relevant pipe 09 or the relevant bore hole 09. An inflow and/or an outflow of the cooling medium are preferably arranged in each case at the end face of the main body 02 of the transport cylinder 01, and more particularly especially in a region that is separate from the outer surface 03 of this transport cylinder 01. When a bore hole 09 through which a liquid or gaseous cooling medium flows, or at least can flow, is formed in the shaft 07, this shaft 07 is in particular configured as a hollow shaft.

For example, water or an industrially produced synthetic cooling medium or refrigerant is a suitable cooling medium. A refrigerant differs from a cooling agent in that a refrigerant, in a refrigeration cycle, is able to remove heat counter to a temperature gradient, so that the ambient temperature surrounding the object to be cooled, which here is the main body 02 of the transport cylinder 01 and/or the cover 08 and/or the gripper or grippers 06, is permitted to be even higher than the temperature of the object to be cooled, while a cooling agent is only able to transport the enthalpy along the temperature gradient to a site having a lower temperature in a cooling cycle.

The above-described transport cylinder 01 is ideally suited for use in a drying unit 16 comprising an electron beam generator 18, wherein this drying unit 16 dries a substrate 11 that is printed with a radiation-curing printing fluid by means of an electron beam by triggering a setting reaction, that is, by curing this printing fluid.

As is shown in FIG. 3 by way of example, a drying unit 16 for drying a radiation-curing printing fluid on a sheet-format substrate (11) is yielded (see FIGS. 1 and 2), wherein the relevant substrate 11 is guided through the chamber 17 with a gaseous medium that is oxygen-reduced by an inert gas. The oxygen-reduced gaseous medium has an oxygen content of no more than 1% in the chamber 17. This oxygen content is preferably in a range between 300 ppm and 500 ppm, in particular in the range between 150 ppm and 250 ppm, possibly even lower, into the range of less than 50 ppm. An electron beam generator 18 including an electron beam that is directed at the substrate 11 in the chamber 17 is provided for drying the radiation-curing printing fluid, wherein the substrate 11 is guided, or at least can be guided, through this chamber 17 while being held at the outer surface 03 of the above-described transport cylinder 01. In a rapid industrial production process, a production speed that goes along with the rotational speed of the transport cylinder 01 is at least, and preferably even considerably more than, 10,000 substrates 11 per hour that are guided through the chamber 17 of the drying unit 16, so that, at such a production speed, each individual substrate 11 held, for example, on a transport cylinder 01 configured to be double-sized passes through this chamber 17 in no more than 720 ms. From this, it becomes evident that, at this production speed, the transport cylinder 01, which here, by way of example, is assumed to be configured to be double-sized, having a diameter in the range between 500 mm and 700 mm allows each 1 mm wide strip, extending transversely to the transport direction T of the substrates 11, on their surfaces to be dried in only approximately 2 ms to 3 ms. The setting reaction, carried out by way of polymerization, of the radiation-curing printing fluid applied to the relevant substrate 11 therefore must be carried out in a very short time, which, based on current knowledge, is only successful when using an electron beam generator 18. In the preferred embodiment, the electron beam extends in a strip shape across the entire width of these substrates 11 extending transversely to the transport direction T of the substrates 11 and is preferably radially directed at the outer surface 03 of the transport cylinder 01, so that this electron beam essentially in each case impinges perpendicularly on the surface of the relevant substrate 11. A heat level of several hundred degrees Celsius is reached in the impingement area of the electron beam and is, for example, more than 300° C.

The drying unit 16 also includes a control unit 19, which is not described in greater detail, controlling at least the electron beam generator 18. The electron beam generator 18 and its control unit 19 form a modular unit, for example, wherein this modular unit is arranged so as to be movable, for example so as to be navigable on a ground by means of wheels 21. In contrast, the transport cylinder 01 is generally arranged in a stationary manner in a machine frame, in particular in a frame of a sheet-fed printing press. Substrates 11 to be dried that were previously printed in the sheet-fed printing press by at least one printing unit can be fed to the transport cylinder 01 of the drying unit 16, for example by means of a first chain conveyor system preferably comprising grippers, and/or the substrates 11 dried in the drying unit 16 can, for example, be received by the aforementioned transport cylinder 01 from a second chain conveyor system that likewise preferably comprises grippers and be transported onward, for example, to a delivery that is part of the sheet-fed printing press. The movability of the modular unit comprising the electron beam generator 18 and its control unit 19 facilitates maintenance and/or repair work being carried out at the drying unit 16 since the transport cylinder 01 and the aforementioned modular unit can be spatially separated from one another in a simple manner by way of locomotion of this modular unit, so that an area between the transport cylinder 01 and the electron beam generator 18 becomes accessible for operating staff.

As described above, the transport cylinder 01 arranged in the drying unit 16, which in FIG. 3 is shown in a sectional view through its main body 02, includes, on its outer surface 03, at least one channel 04 that extends in each case transversely to the transport direction T of the relevant substrate 11, which is directed in the direction of rotation D of the transport cylinder 01, wherein in each case at least one gripper 06 for holding the relevant substrate 11 on the outer surface 03 of this transport cylinder 01 is arranged in the relevant channel 04 (FIGS. 1 and 2). The relevant channel 04 is covered by a cover 08 at the outer surface 03 of this transport cylinder 01, wherein the cover 08 includes a recess at the location of the relevant gripper 06. The relevant gripper 06 is configured as an underfloor gripper. At least the relevant cover 08, possibly, however, also a shaft 07 supporting the at least one gripper 06, each comprise a cooling unit in the manner described above based on FIGS. 1 and 2.

The drying unit 16 comprises a housing 22, which encloses the side facing the electron beam generator 18, of the transport cylinder 01, which is preferably horizontally mounted, in particular in the machine frame of a sheet-fed printing press, approximately over half a side, that is, in a sheet section of at least 160°, at least during a production process. This housing 22 thus enclosing the transport cylinder 01 comprises two molded parts 23; 24, which are arranged symmetrically with respect to a plane defined by the progression of the electron beam, wherein their outer delimitation facing the outer surface 03 of the transport cylinder 01 is in each case adapted to the contour of this transport cylinder 01 and, for forming a gap 26, is arranged spaced apart no more than 3 mm, in particular in a range, for example, between 2 mm and 3 mm, from the outer surface 03 of the transport cylinder 01. These two molded parts 23; 24 are arranged so as to be spaced apart from one another in the chamber 17 of the drying unit 16 in an area that is configured orthogonally to the plane defined by the progression of the electron beam to allow unimpeded propagation of the electron beam. For radiation protection, the two molded parts 23; 24 in each case comprise a shield 27; 28, which preferably each include the material lead, wherein this shield 27; 28 is in each case configured in the form of a lead panel. The gap 26 that is formed in each case between each of the two molded parts 23; 24 and the outer surface 03 of the transport cylinder 01 preferably extends at the circumference of the transport cylinder 01 over a sheet section of at least 75°, in particular at least 80°, and preferably has a gap width of no more than 3 mm, and in particular of 2 mm to 3 mm. Such a long and narrow gap 26 offers good protection against radiation exiting the chamber 17 and also sufficiently seals this chamber 17, so that in each case inert gas does not escape from this chamber 17, or oxygen from the surrounding area does not penetrate into this chamber 17, to any noteworthy extent.

Using the drying unit 16 described above based on FIGS. 1 to 3, a sheet-fed printing press is yielded, comprising at least one printing unit for printing sheet-format substrates 11 with a radiation-curing printing fluid and comprising a drying unit 16, which is arranged downstream from the relevant printing unit in the transport direction T of the relevant substrates 11, for drying the radiation-curing printing fluid on these substrates 11, wherein the drying unit 16 comprises a chamber 17 including a gaseous medium that is oxygen-reduced by an inert gas, the oxygen-reduced gaseous medium in the chamber 17 having an oxygen content of no more than 1%. An electron beam generator 18 including an electron beam that is directed at the particular substrate 11 in the chamber 17 is provided for drying the radiation-curing printing fluid. The substrate 11 is guided, or at least can be guided, through this chamber 17 while being held at the outer surface 03 of a transport cylinder 01, which is arranged in a stationary manner in a frame of the sheet-fed printing machine, wherein the transport cylinder 01, at its outer surface 03, includes at least one channel 04 extending in each case transversely to the transport direction T of the relevant substrate 11. At least one gripper 06, which is supported on a shaft 07, for holding the relevant substrate 11 on the outer surface 03 of this transport cylinder 01 is arranged in each case in the relevant channel 04, wherein the relevant gripper 06, in its operating state in which it holds the relevant substrate 11 on the outer surface 03 of this transport cylinder 01, is arranged completely beneath a plane formed by the outer surface 03 of this transport cylinder 01. The relevant channel 04 is covered by a cover 08 at the outer surface 03 of the transport cylinder 01, wherein the relevant cover 08 and/or the shaft 07 supporting the at least one gripper 06 in each case include a cooling unit.

Advantageously, a first chain conveyor system for feeding substrates 11 to be dried, which were previously printed by the at least one printing unit of the sheet-fed printing press, to the transport cylinder 01 of the drying unit 16, and/or a second chain conveyor system for removing substrates 11 dried in the drying unit 16 from the transport cylinder 01 of the drying unit 16 to, for example, a delivery of this sheet-fed printing press are provided. In an industrial production process carried out by this sheet-fed printing press, the production speed that goes along with the rotational speed of the transport cylinder 01 is at least 10,000 substrates 11 per hour, wherein preferably all of these substrates 11 are guided through the chamber 17 of the drying unit 16.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A transport cylinder for transporting a sheet-format substrate, the transport cylinder comprising:
   at least one channel extending at an outer surface of the transport cylinder in an axial direction of the transport cylinder;
   at least one gripper, which is supported on a shaft, for holding the sheet-format substrate on the outer surface of the transport cylinder, the at least one gripper arranged in the at least one channel; and
   a cover at the outer surface of the transport cylinder and covering the at least one channel, wherein the cover and/or the shaft supporting the at least one gripper comprise a cooling unit.

2. The transport cylinder according to claim 1, further comprising a main body that is made of a casting material and/or wherein the outer surface is configured to be at least over 90 percent closed.

3. The transport cylinder according to claim 1, wherein the at least one channel comprises two channels disposed on a circumference of the transport cylinder, the two channels each extending along the outer surface of the transport cylinder in the axial direction, and being disposed diametrically opposed to each other.

4. The transport cylinder according to claim 1, wherein:
   the cover is configured as one piece by a solid steel sheet or by a solid metallic molded part; and/or
   the cover, at a location of the at least one gripper, includes a recess that is adapted to a contour of the at least one gripper.

5. The transport cylinder according to claim 1, wherein the at least one gripper, in an operating state in which the at least one gripper holds the sheet-format substrate on the outer surface of the transport cylinder, is arranged completely beneath a plane formed by the outer surface of the transport cylinder.

6. The transport cylinder according to claim 1, wherein:
   the cooling unit comprises at least one pipe extending in the axial direction of the transport cylinder, a liquid or gaseous cooling medium flowing, or at least being able to flow, through the pipe; and/or
   the cooling unit includes at least one bore hole, which is formed in the cover and/or in the shaft, and extends in the axial direction of the transport cylinder, a liquid or gaseous cooling medium flowing, or at least being able to flow, through the at least one bore hole.

7. The transport cylinder according to claim 6, wherein an inflow and/or an outflow of the cooling medium is arranged at an end face of a main body of the transport cylinder, in a region that is separate from the outer surface.

8. A drying unit for drying a radiation-curing printing fluid on a sheet-format substrate, the drying unit comprising:
   a chamber including a gaseous medium that is oxygen-reduced by an inert gas, the oxygen-reduced gaseous medium in the chamber having an oxygen content of no more than one percent;
   an electron beam generator including an electron beam that is directed at the substrate in the chamber being provided for drying the radiation-curing printing fluid;
   a transport cylinder, wherein the sheet-format substrate is guided, or at least guidable, through the chamber while being held at an outer surface of the transport cylinder; the transport cylinder at the outer surface, including at least one channel extending transversely to a transport direction of the sheet-format substrate;
   the transport cylinder including at least one gripper, supported on a shaft, and arranged in the at least one channel for holding the sheet-format substrate on the outer surface of the transport cylinder;
   the at least one gripper in an operating state in which the at least one gripper holds the sheet-format substrate on the outer surface of the transport cylinder, being arranged completely beneath a plane formed by the outer surface of the transport cylinder;
   the channel being covered by a cover at the outer surface of the transport cylinder; and
   the cover and/or the shaft supporting the at least one gripper comprising a cooling unit.

9. The drying unit according to claim 8, further comprising a housing, which encloses a side of the transport cylinder facing the electron beam generator in a sheet section of at least 150°, at least during a production process.

10. The drying unit according to claim 9, wherein the housing enclosing the side of the transport cylinder comprises two molded parts, which are arranged symmetrically with respect to a plane defined by a progression of the electron beam, an outer delimitation of the two molded parts facing the outer surface of the transport cylinder being adapted to a contour of the transport cylinder and, for forming a gap, being arranged spaced apart in a range of no more than 3 mm from the outer surface of the transport cylinder.

11. The drying unit according to claim 10, wherein the two molded parts each comprise a shield comprising lead.

12. The drying unit according to claim 10, wherein:
   a respective portion of the gap that is formed between each of the two molded parts and the outer surface of the transport cylinder extends at a circumference of the transport cylinder over a sheet section of at least 75°; and/or
   the respective portion of the gap that is formed between each of the two molded parts and the outer surface of the transport cylinder has a gap width in a range between 2 mm and 3 mm.

13. A sheet-fed printing press comprising:
   at least one printing unit for printing sheet-format substrates with a radiation-curing printing fluid; and
   a drying unit, which is arranged downstream from the printing unit in a transport direction of the sheet-format substrates, for drying the radiation-curing printing fluid on the sheet-format substrates, the drying unit comprising:
      a chamber including a gaseous medium that is oxygen-reduced by an inert gas, the oxygen-reduced gaseous medium in the chamber having an oxygen content of no more than one percent;
      an electron beam generator including an electron beam that is directed at a respective substrate in the chamber for drying the radiation-curing printing fluid; the respective substrate being guided, or at least being guidable, through the chamber while being held at an outer surface of a transport cylinder that is arranged in a stationary manner in a frame of the sheet-fed printing press; the transport cylinder, at the outer surface, including at least one channel extending transversely to the transport direction of the respective substrate; the transport cylinder further including at least one gripper, which is supported on a shaft, for holding the respective substrate on the outer surface of the transport cylinder, the at least one gripper being arranged in the at least one channel; the at least one gripper, in an operating state in which the at least one gripper holds the respective substrate on the outer surface of the transport cylinder, being arranged completely beneath a plane formed by the outer surface of the transport cylinder; the at least one channel being covered by a cover at the outer surface of the transport cylinder; and the cover and/or the shaft supporting the at least one gripper comprising a cooling unit.

14. The sheet-fed printing press according to claim 13, further comprising:
 a first chain conveyor system for feeding the sheet-format substrates to be dried, which were previously printed by the at least one printing unit, to the transport cylinder of the drying unit, and/or
 a second chain conveyor system for removing the sheet-format substrates dried in the drying unit from the transport cylinder of the drying unit.

15. The sheet-fed printing press according to claim 13, wherein a production speed of the sheet-fed printing press that matches the rotational speed of the transport cylinder is at least 10,000 of the sheet-format substrates per hour, all of the sheet-format substrates being guided through the chamber of the drying unit by the transport cylinder.

\* \* \* \* \*